No. 834,430. PATENTED OCT. 30, 1906.
C. WIGHTMAN, J. W. BISHOP & W. H. ANDERECK.
PERCOLATOR.
APPLICATION FILED JULY 22, 1905.
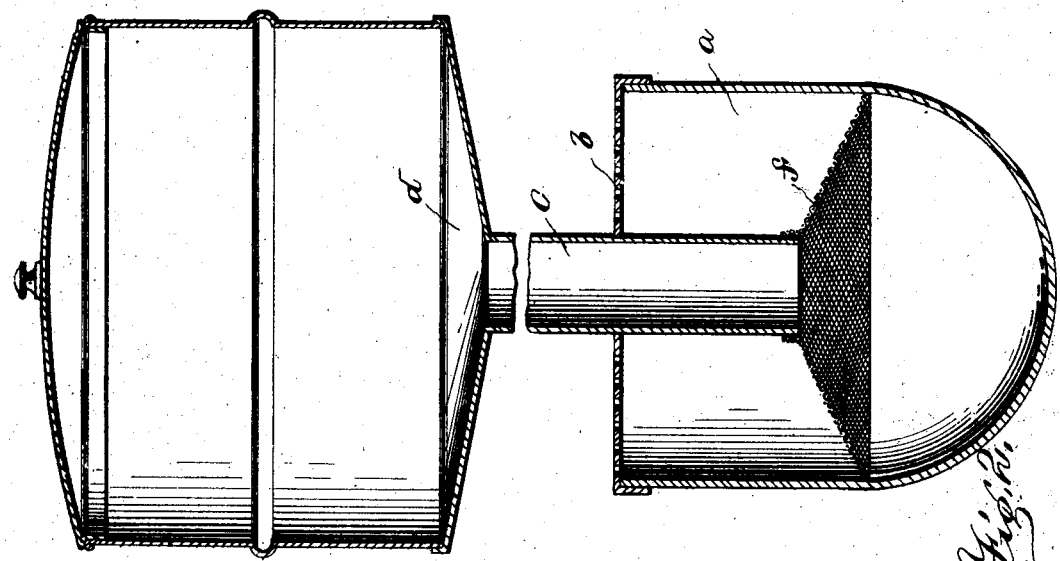
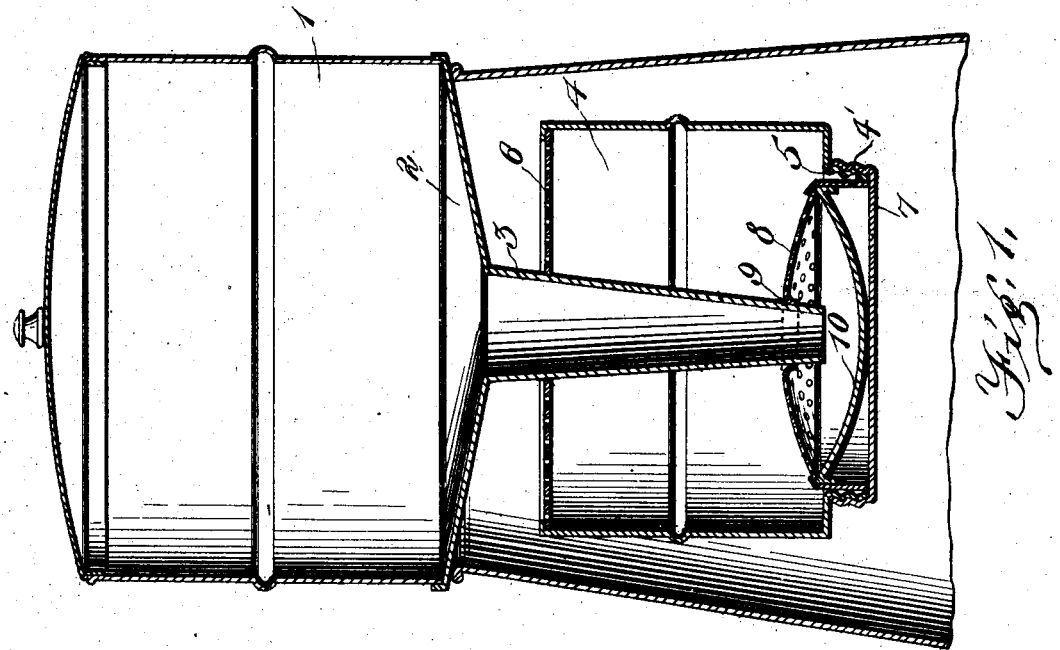
WITNESSES:
INVENTORS

UNITED STATES PATENT OFFICE.

CHARLES WIGHTMAN, JOSEPH W. BISHOP, AND WILLIAM H. ANDERECK, OF LITTLE ROCK, ARKANSAS, ASSIGNORS OF ONE-FOURTH TO R. G. FERGUSON, OF LITTLE ROCK, ARKANSAS.

PERCOLATOR.

No. 834,430.        Specification of Letters Patent.        Patented Oct. 30, 1906.

Application filed July 22, 1905. Serial No. 270,817.

*To all whom it may concern:*

Be it known that we, CHARLES WIGHTMAN, JOSEPH W. BISHOP, and WILLIAM H. ANDERECK, citizens of the United States of America, residing at Little Rock, in the county of Pulaski and State of Arkansas, have invented certain new and useful Improvements in Percolators, of which the following is a specification.

This invention relates to new and useful improvements in percolators, and is intended more especially for use in the making of so-called "drip" coffee, although it is to be understood that a device constructed according to this invention could be used with equal facility for the filtering of water, it being but necessary to substitute for the coffee a filtering agent, such as charcoal or the like.

It is an object of the invention to provide a novel device of this character that can be readily applied to a coffee-pot or vessel of any preferred or ordinary construction, and it is the intention of the invention to so construct the device that it may be easily and thoroughly cleansed with little difficulty.

It is also an object of the invention to provide a novel device of this kind that will be simple in construction, efficient in practice, and economical to manufacture.

With the above and other objects in view the invention consists in the details of construction and in the arrangement and combination of parts to be hereinafter more fully described and claimed.

In describing the invention in detail reference will be had to the accompanying drawings, forming part of this specification, wherein like characters of reference denote corresponding parts in both views, and in which—

Figure 1 is a view in section of the invention, the same being shown applied to a coffee-pot or receptacle, also in section. Fig. 2 is a sectional view of a modified form of the invention.

In the drawings, 1 indicates a receptacle adapted to be inserted within a coffee-pot or the like and to be supported thereby. The bottom 2 of the receptacle 1 is convexed and communicates centrally with a depending tube 3, which extends a suitable distance below the receptacle 1. Held by the tube 3 is a second smaller receptacle 4, which is closed at the top by a reticulated plate or screen 6 and open at the bottom, said opening at the bottom being surrounded by an annular threaded flange 5, which is engaged by a screw-cap 7. The tube 3 extends within the receptacle 4 and terminates at a point slightly below the bottom thereof. Fitting within the receptacle 4 and insertible through the opening in the bottom thereof is a second reticulated plate or screen 8, which has a central perforation or opening 9 to receive the tube 3. The screen 8 bears against the walls of the annular flat ring 4' and is intended to confine the coffee or other material within the receptacle. The ring 4' rests on the cover 7, and thus it can be seen that the cover 7 will provide a support or rest for said screen 8.

Water is placed within the receptacle 1 and passes down through the tube 3 to the bottom of the receptacle 4. It then passes up through the screen 8 through the material in the receptacle 4, through the screen-top 6, into the coffee-pot proper, an operation which is thought to be clearly apparent to those skilled in the art to which this invention appertains.

In order that the screen or plate 8 may be easily removed for the insertion or removing of the coffee or for the purpose of cleaning, a handle or bail 10 is secured thereto, the ends of the bail being attached near the opposite edges of the plate. The bail 10 is made, preferably, of a resilient strip of metal and is intended when the screen 8 is in applied position to bear against the cover 7. By this means the screen 8 is held in its operative position, which is slightly above the lower end of the tube 3, with the wall of the opening 9 in such close engagement with the tube as to prevent sediment from passing between the tube and screen.

In Fig. 2 a slightly-modified form of invention is illustrated. This form is constructed similar to the preferred form, with the exception that the lower receptacle *a* has its removable reticulated top *b* slidable on the depending tube *c* of the top receptacle *d*. The bottom of the receptacle *a* is integral with the receptacle. The tube *c* has secured to and flush with its lower end a screen *f*, which is inclined and secured to the walls of the receptacle *a*. In a device constructed in this manner the percolator can be readily cleansed by reversing the current of the water or fluid, and as the lower screen *f* is flush with the end of the tube *c* no sediment will be allowed to collect, but will readily pass off.

Having thus fully described our invention, what we claim as new, and desire to secure by Letters Patent, is—

1. In combination, a receptacle, a tube depending therefrom, a second receptacle held by the tube, said receptacle having a reticulated body, a reticulated partition within the second receptacle dividing the same into an upper and lower compartment, the tube of the first-named receptacle communicating with the lower compartment only.

2. In combination, a receptacle, a tube depending therefrom, a second receptacle held by the tube, said second receptacle having a reticulated body, said second receptacle having an opening in its bottom, a reticulated partition insertible through the opening in the bottom of the last-named receptacle to divide said receptacle into an upper and lower compartment, the tube of the first-named receptacle communicating with the lower chamber only, and a cover for the opening of the lower receptacle.

3. In combination, a receptacle, a tube depending therefrom, a second receptacle held by the tube, said second receptacle having a reticulated body, said second receptacle having an opening in its bottom, a reticulated partition insertible through the opening in the bottom of the last-named receptacle to divide said receptacle into an upper and lower compartment, the tube of the first-named receptacle communicating with the lower chamber only, and a cover for the opening of the lower receptacle, said cover supporting the partition.

4. In combination, a receptacle, a tube depending therefrom, a second receptacle held by the tube, said second receptacle having a reticulated body, said second receptacle having an opening, a reticulated partition insertible through the opening of the last-named receptacle to divide said receptacle into an upper and lower compartment, the tube of the first-named receptacle communicating with the lower chamber only and means for closing the opening of the second receptacle.

5. In combination, a receptacle, a tube depending therefrom, a second receptacle held by the tube, said second receptacle having a reticulated body, said second receptacle having an opening, a reticulated partition insertible through the opening of the last-named receptacle to divide said receptacle into an upper and lower compartment, the tube of the first-named receptacle communicating with the lower chamber only, means for closing the opening of the second receptacle, and means contacting with the closure of the opening for supporting the reticulated partition.

In testimony whereof we affix our signatures, in the presence of two witnesses, this 19th day of July, 1905.

CHARLES WIGHTMAN.
JOSEPH W. BISHOP.
WILLIAM H. ANDERECK.

Witnesses:
C. L. GORDY,
C. A. WHEELOCK.